US009547954B2

(12) United States Patent
Anderson et al.

(10) Patent No.: US 9,547,954 B2
(45) **Date of Patent: *Jan. 17, 2017**

(54) ASSOCIATING MOBILE DEVICE WITH ELECTRONIC GAMING MACHINE

(71) Applicant: Bally Gaming, Inc., Las Vegas, NV (US)

(72) Inventors: Peter R. Anderson, Glenview, IL (US); Randy S. Demsetz, Volo, IL (US); Mark B. Gagner, West Chicago, IL (US); Paul M. Lesley, Blue Island, IL (US); Timothy C. Loose, Chicago, IL (US); Scott A. Massing, Lincolnwood, IL (US); Craig J. Sylla, Round Lake, IL (US)

(73) Assignee: BALLY GAMING, INC., Las Vegas, NV (US)

( * ) Notice: Subject to any disclaimer, the term of this patent is extended or adjusted under 35 U.S.C. 154(b) by 113 days.

This patent is subject to a terminal disclaimer.

(21) Appl. No.: 14/541,926

(22) Filed: Nov. 14, 2014

(65) Prior Publication Data

US 2015/0072774 A1 Mar. 12, 2015

Related U.S. Application Data

(63) Continuation of application No. 13/788,971, filed on Mar. 7, 2013, now Pat. No. 8,926,422.

(Continued)

(51) Int. Cl.

*A63F 13/00* (2014.01)
*G07F 17/32* (2006.01)

(52) U.S. Cl.

CPC ....... *G07F 17/3225* (2013.01); *G07F 17/3209* (2013.01); *G07F 17/3218* (2013.01); *G07F 17/3223* (2013.01); *G07F 17/3244* (2013.01)

(58) Field of Classification Search

None

See application file for complete search history.

(56) References Cited

U.S. PATENT DOCUMENTS

| | | | | | |
|---|---|---|---|---|---|
| 6,846,238 | B2 * | 1/2005 | Wells | G07F 17/32 | 463/25 |
| 2003/0064805 | A1 * | 4/2003 | Wells | G07F 17/32 | 463/39 |

(Continued)

OTHER PUBLICATIONS

"U.S. Appl. No. 13/788,971 Final Office Action", Aug. 5, 2014, 9 Pages.

(Continued)

*Primary Examiner* — Sunit Pandya

(74) *Attorney, Agent, or Firm* — DeLizio Law, PLLC

(57) ABSTRACT

A wagering game system and its operations are described herein. In some embodiments, the operations can include communicably connecting a mobile device to a wagering game server on a wagering game network. The operations can further include associating, by the wagering game server, the mobile device with a selected wagering game machine among a plurality of wagering game machine. The operations can further include providing content to present on the mobile device, the content including a play initiation button of a wagering game played via the selected wagering game machine. The operations can further include in response to the play initiation button being actuated, receiving, at the wagering game server, a command from the mobile device to initiate play of the wagering game. The operations can further include in response to the command, presenting a result of the wagering game on the selected wagering game machine.

35 Claims, 11 Drawing Sheets

Related U.S. Application Data

(60) Provisional application No. 61/753,836, filed on Jan. 17, 2013.

(56) References Cited

U.S. PATENT DOCUMENTS

| | | | | |
|---|---|---|---|---|
| 2005/0101383 | A1 | 5/2005 | Wells | |
| 2005/0130728 | A1* | 6/2005 | Nguyen | G07F 17/32 463/16 |
| 2005/0227770 | A1* | 10/2005 | Papulov | G07F 17/32 463/42 |
| 2006/0189382 | A1 | 8/2006 | Muir et al. | |
| 2008/0076572 | A1* | 3/2008 | Nguyen | G07F 17/32 463/42 |
| 2009/0197684 | A1* | 8/2009 | Arezina | G07F 17/3216 463/42 |
| 2013/0017884 | A1 | 1/2013 | Price et al. | |
| 2013/0023339 | A1 | 1/2013 | Davis et al. | |
| 2013/0053129 | A1* | 2/2013 | LeMay | G07F 17/3223 463/25 |
| 2013/0053136 | A1 | 2/2013 | Lemay et al. | |
| 2013/0053148 | A1 | 2/2013 | Nelson et al. | |
| 2013/0065668 | A1 | 3/2013 | Lemay et al. | |
| 2013/0084963 | A1* | 4/2013 | Shorrock | G07F 17/3225 463/25 |
| 2014/0200065 | A1 | 7/2014 | Anderson et al. | |

OTHER PUBLICATIONS

Co-pending U.S. Appl. No. 13/788,971, filed Mar. 7, 2013, 43 pages.

* cited by examiner

ASSOCIATING MOBILE DEVICE WITH ELECTRONIC GAMING MACHINE

RELATED APPLICATIONS

This Application is a continuation of U.S. patent application Ser. No. 13/788,971 filed on 7 Mar. 2013, which claims the benefit of U.S. Provisional Application Ser. No. 61/753,836 filed 17 Jan. 2013.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2014, WMS Gaming, Inc.

FIELD

Embodiments of the inventive subject matter relate generally to wagering game systems, and more particularly to wagering game systems including mobile devices.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

BRIEF DESCRIPTION OF THE FIGURES

Embodiments of the invention are illustrated in the Figures of the accompanying drawings in which.

DESCRIPTION OF THE EMBODIMENTS

This description of the embodiments is divided into five sections. The first section provides an introduction to embodiments of the invention, while the second section describes example operations performed by some embodiments. The third section describes example wagering game machine architectures and the fourth section describes example wagering game machines in more detail. The fifth section presents some general comments.

Introduction

This section provides an introduction to some embodiments of the invention.

Many wagering game machines are operated by controls that are built into the wagering game machine. For example, players spin reels, discard playing cards, etc. by pressing buttons, touching touchscreens, and otherwise interacting with controls on a wagering game machine. Because the controls are built into the wagering game machines, players are forced to position themselves so they can reach the controls. For example, when seated on a stool, players may have to lean forward to reach a machine's controls. Some players may find this cumbersome and uncomfortable. Some embodiments of the inventive subject matter allow players to control game play from a mobile device. Some embodiments present portions of the wagering game on the mobile device, in lieu of presenting it on the wagering game machine's display device. Such embodiments may allow the player to play the wagering game in a more comfortable position, such as reclined in a chair by the wagering game machine. Before a wagering game machine can present and control wagering games on a mobile device, embodiments perform operations to associate the mobile device with the wagering game machine. After such an association is established, some embodiments enable players to view and control wagering games on mobile devices. The discussion of FIG. 1 shows how some embodiments can associate a mobile device to a wagering game machine, and how wagering games may be presented and controlled on mobile devices.

Figure 1:
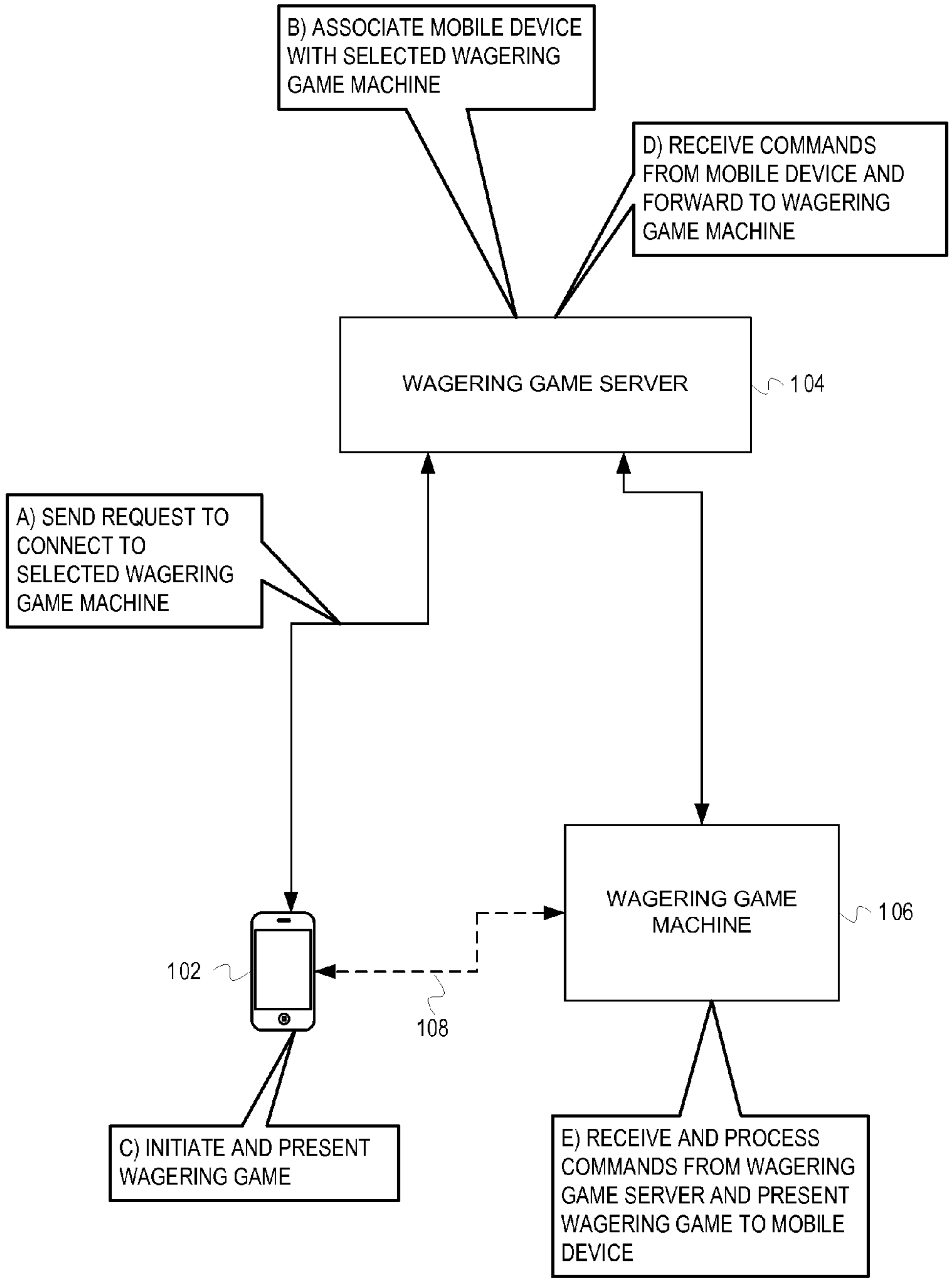
FIG. 1 depicts an embodiment of the interactions between a mobile device 102, a wagering game server 104, and a wagering game machine 106.

FIG. 1 depicts an embodiment of interactions between a mobile device 102, a wagering game server 104, and a wagering game machine 106. FIG. 1 depicts example operations at stages A-E.

At stage A, the mobile device 102 sends a request to the wagering game server 104 to connect to the wagering game network. The request identifies a particular wagering game machine with which the mobile device will play games. In some embodiments, to connect to the wagering game network, the player uses the mobile device 102 to navigate to a webpage hosted by a casino computer. From the webpage, the player can choose to connect to the wagering game network to play a selected wagering game machine 106 from the mobile device 102. In other embodiments, the mobile device 102 uses an application program to connect to the wagering game network. Upon launching the application program on the mobile device 102, the player can choose to connect to the wagering game network to play a selected wagering game machine 106. The player can select a wagering game machine by transmitting to the server 104 a unique code associated with the selected wagering game machine. For example, the mobile device 102 can capture and transmit a photo of a bar code presented on the wagering game machine 106, where the bar code uniquely identifies the wagering game machine 106.

At stage B, the wagering game server 104 associates the mobile device 102 with the selected wagering game machine 106. In some embodiments, this association enables the wagering game server 104 to facilitate communications between the mobile device 102 and the selected wagering game machine (e.g., wagering game machine 106).

At stage C, a player initiates a wagering game on the wagering game machine 106. The wagering game machine 106 presents at least part of the wagering game on the mobile device 102. For example, a reel spin button may be presented on the mobile device 102. The player can then select the reel spin button on the mobile device 102. The mobile device 102 may present the wagering game via browser-based presentation or via a dedicated application program running on the mobile device 102. In some embodiments, the player may be able to control all functionality of the wagering game from the mobile device 102. In other embodiments, the mobile device 102 may present only portions of the wagering game, such as a spin button, a credit meter, etc. By controlling the wagering game via the mobile device 102, the player may be able to position themselves more comfortably while playing the wagering game.

At stage D, the wagering game server 104 receives commands from the mobile device 102 and forwards the commands to the selected wagering game machine 106. From the example above, a reel spin button may be presented on the mobile device 102. The player can then select the reel spin button on the mobile device 102. The selection of the reel spin button ("button selection") is then transmitted from the mobile device 102 to the wagering game server 104. The wagering game server 104 then forwards the button selection to the selected wagering game machine 106, initiating a reel spin on the selected wagering game machine 106. Some embodiments detect player input in other ways. For example, a player may waive the mobile device 102 to indicate a command to the wagering game server 104. For example, an accelerometer in the mobile device 102 may sense a gesture or movement of the mobile device 102 that indicates a specific action in the wagering game, such as a reel spin, etc. In some embodiments, the commands may not be communicated to the wagering game server 104.

At stage E, the selected wagering game machine 106 receives and processes the commands from the wagering game server 104. For example, a reel spin indicated on the mobile device 102 is actuated on the wagering game machine 106. Additionally, the wagering game machine presents the wagering game to the mobile device 102 after the command is processed. In some embodiments, the selected wagering game machine can instruct the wagering game server 104 to present the wagering game to the mobile device 102. In other embodiments, the selected wagering game machine 106 can present the wagering game directly to the mobile device 102, as indicated by arrow 108.

In some embodiments, the mobile device 102 may communicate commands directly to the selected wagering game machine 106, as indicated by arrow 108. For example, the player may select a reel spin button presented on the mobile device 102. The mobile device 102 can then transmit the button selection directly to the selected wagering game machine 106.

These and other embodiments are described in more detail below.

Example Operations

This section describes operations associated with some embodiments of the invention. In the discussion below, the flow diagrams will be described with reference to the block diagrams presented above. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

The section will discuss FIGS. 2-8. The discussion of FIGS. 2-4 will describe operations for creating an association between a mobile device and a selected wagering game machine, and presenting wagering games on the mobile device.

Figure 2:
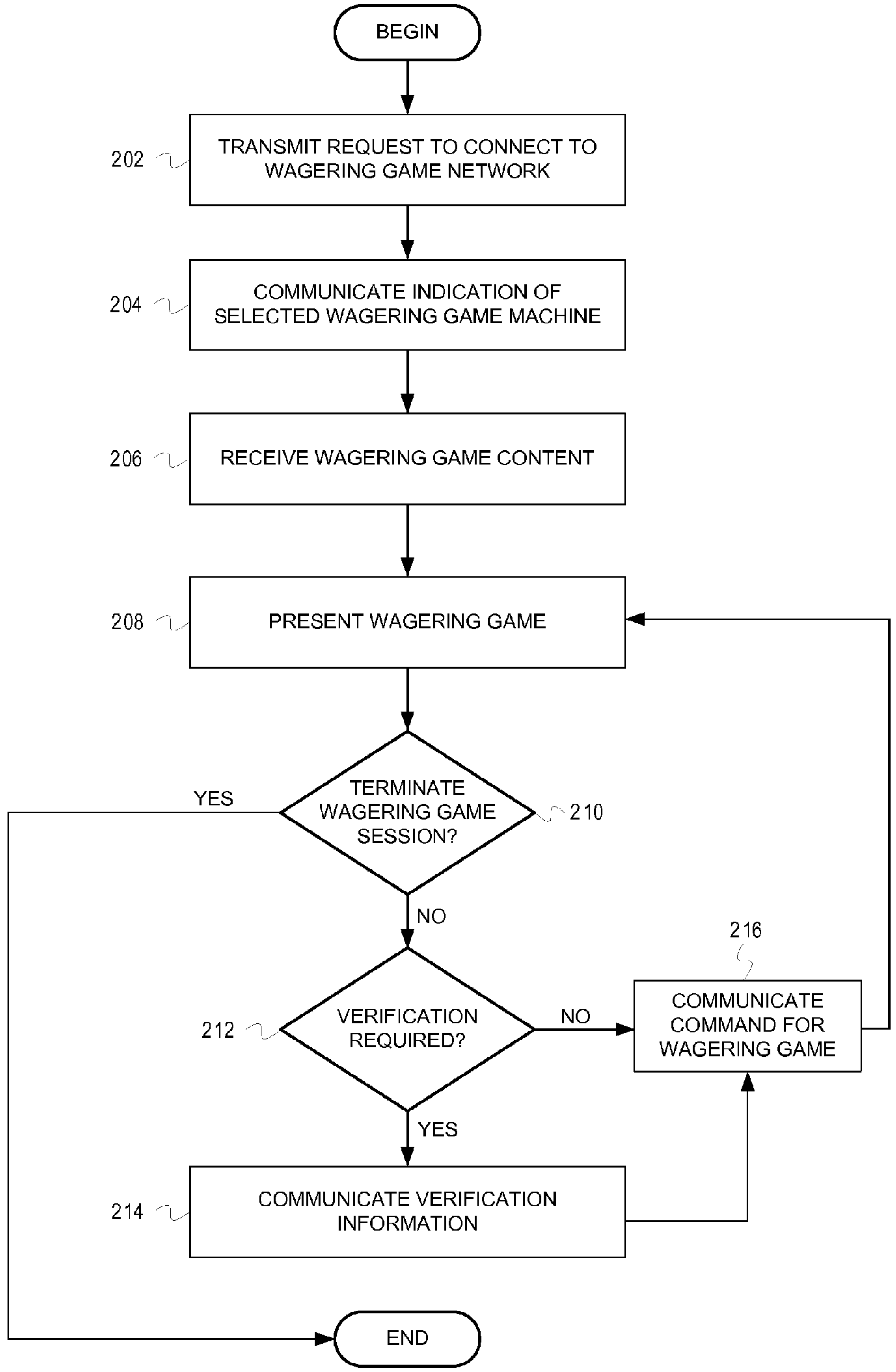
FIG. 2 is a flow diagram illustrating operations for enabling a mobile device to play wagering games via a selected wagering game machine, according to some embodiments of the inventive subject matter.

FIG. 2 is a flow diagram illustrating operations for enabling a mobile device to play wagering games via a selected wagering game machine, according to some embodiments of the inventive subject matter. The flow begins at block 202.

At block 202, the mobile device transmits a request to connect to the wagering game network. In some embodiments, the mobile device connects to a wireless access point, and transmits a network connection request to a wagering game server via the access point (e.g., using an application program, via a website, etc.). In some embodiments, the mobile device may use a cellular telephone network or other network to transmit the request. The flow continues at block 204.

At block 204, the mobile device communicates an indication of the selected wagering game machine. Such indication may include a unique identifier associated with the selected wagering game machine. In some embodiments, a unique code displayed on the selected wagering game machine may be entered at the mobile device for transmission to the wagering game server. In other embodiments, an image capture device of the mobile device may be used to capture the unique identifier for transmission to the wagering game server. The flow continues at block 206.

At block 206, the mobile device receives wagering game content. The content can include game results, data used in presenting game results (e.g., graphics data, animation data audio data, etc.), and any other information necessary for presenting at least a portion of the wagering game on the mobile device. Some of the wagering game content can originate at the selected wagering game machine. For example, the wagering game machine may determine game results and transmit them for use by the mobile device. In some embodiments, the wagering game server receives the wagering game content from the wagering game machine and forwards it to the mobile device. Alternatively, the mobile device can receive the wagering game content directly from the wagering game machine. In yet another alternative, the wagering game content may originate at the wagering game server, as the server may centrally determine all game results for the wagering game machines. The flow continues at block 208.

At block 208, the mobile device presents the wagering game. In some embodiments, the mobile device may present the same information as displayed on the wagering game machine. In other words, the mobile device may mirror the wagering game machine display. In such embodiments, the player may be able to select items on the mobile device display as if they were selecting items on the wagering game machine display. In other embodiments, only some of the wagering game content may be presented on the mobile device. The flow continues at block 210.

At block 210, if the wagering game session is terminated, the flow ends. If the wagering game session has not been terminated, the flow continues at block 212.

At block 212, the mobile device may be required to participate in a verification process to ensure that the mobile device is in proximity to the wagering game machine. In some embodiments, the verification process may be periodic and may not be necessary before each command is executed (e.g., before each reel spin in a slots game). In other embodiments, the verification process may be required before each command is executed. If verification is not required, the flow continues at block 216. If verification is required, the flow continues at block 214.

At block 214, the mobile device communicates verification information. For clarity, the following discussion describes communications between the mobile device and wagering game server. However, in some embodiments, the mobile device may communicate verification information directly to the selected wagering game machine. In such embodiments, the selected wagering game machine may request verification information directly from the mobile device.

Verifying that the mobile device is in proximity to the wagering game may help ensure that the appropriate mobile device is communicating commands to the selected wagering game machine (and not to another wagering game machine that was not selected). This verification process can include any suitable form of location detection. For example, the wagering game server could request GPS coordinates from the mobile device, and compare them to known GPS coordinates of the selected wagering game machine. Alternatively, the wagering game server could use transmitters located throughout the casino to triangulate the position of the mobile device to ensure that the mobile device is in proximity to the selected wagering game machine.

Additionally, the wagering game sever can instruct the selected wagering game machine to emit a sound, NFC transmission, etc. to the mobile device. If the mobile device is in proximity to the selected wagering game machine, the mobile device will perceive the sound or receive the transmission. The mobile device can then communicate the verification information back to the wagering game server. For example, sounds of differing frequencies may be emitted from separate speakers of the selected wagering game machine. The frequencies emitted from the speakers can be designed to interact with one another at a point near the selected wagering game machine, creating a third frequency (the combination of the two sound waves). If the mobile device is within a threshold distance from the intersection point, the mobile device will perceive the third frequency. The mobile device can then communicate the third frequency to the selected wagering game machine or the wagering game server. After communicating the verification information, the flow continues at block 216.

At block 216, the mobile device communicates the command for the selected wagering game. In some embodiments, the mobile device may communicate the command for the wagering game directly to the selected wagering game machine. In other embodiments, the mobile device may communicate the command for the wagering game to the wagering game server. The flow continues at block 208.

At block 208, the mobile device presents the wagering game. The flow repeats until the wagering game session is terminated at bock 210.

Figure 3:
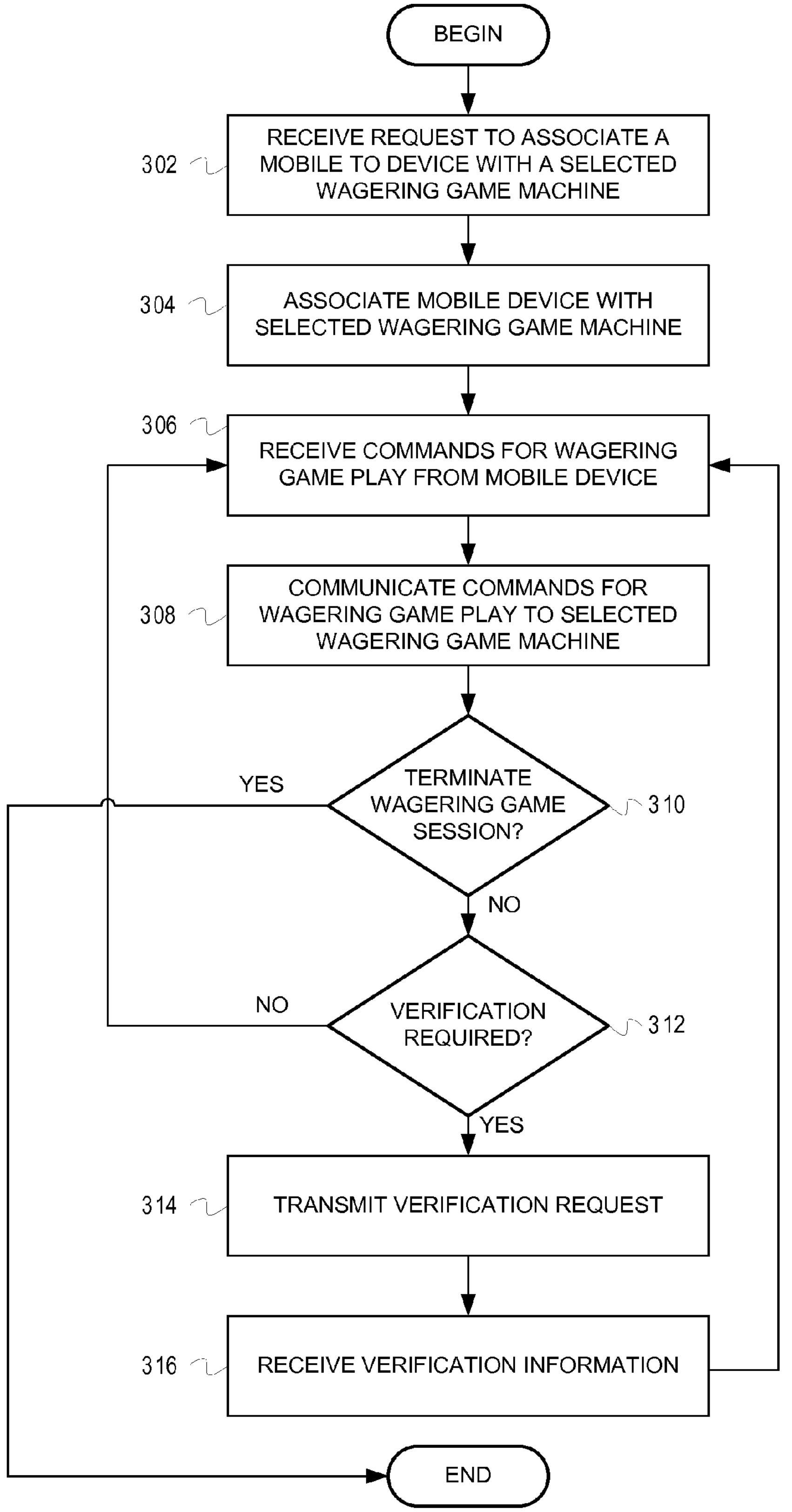
FIG. 3 is a flow diagram illustrating operations for enabling a mobile device to play wagering games via a selected wagering game machine, according to some embodiments of the inventive subject matter.

While FIG. 2 describes how the mobile device interacts with the wagering game server and the wagering game machine, FIG. 3 describes how the wagering game server interacts with the mobile device and the wagering game machine.

FIG. 3 is a flow diagram illustrating operations for enabling a mobile device to play wagering games via a selected wagering game machine, according to some embodiments of the inventive subject matter. The flow begins at block 302.

At block 302, the wagering game server receives an indication to associate a mobile device with a selected wagering game machine. Such indication may originate from the mobile device and include a unique identifier (e.g., numeric code, bar code photo, bar code information, QR code, etc.) identifying the selected wagering game machine. In some embodiments, a single wagering game server may be in communication with a plurality of wagering game machines. In other embodiments, each wagering game machine may have a dedicated wagering game server, either internal or external to the wagering game machine. Each wagering game server can also include a web server to facilitate communications with mobile devices. The flow continues at block 304.

At block 304, the wagering game server associates the mobile device with the selected wagering game machine. In some embodiments, the wagering game server records the mobile device's media access control (MAC) address in association with the wagering game machine's address (e.g., in a table). The wagering game server may send the wagering game machine address to the mobile device to facilitate direct communication between the mobile device and the selected wagering game machine. Once the mobile device is associated with the selected wagering game machine, no other mobile devices can be associated with the selected wagering game machine. In other words, once the mobile device is associated with the selected wagering game machine, only the player using the mobile device can play wagering games on the selected wagering game machine. Although the player may be able to control some aspects of the wagering game from the mobile device, in some embodiments, the wagering game machine's controls (e.g., buttons, levers, etc.) may still function to control some or all aspects of the wagering game on the selected wagering game machine. In other embodiments, the controls are "lockedout" to prevent by-standers from affecting wagering games by interacting with the machine's controls. The flow continues at block 306.

At block 306, the wagering game server receives commands for wagering game play from the mobile device. Such commands can include commands to initiate game play, place bets, etc. As previously discussed, in some embodiments, this step may be unnecessary, as the mobile device can communicate commands directly to the selected wagering game machine. The flow continues at block 308.

At block 308, the wagering game server communicates commands for wagering game play to the selected wagering game machine. As previously discussed, in some embodiments, this step may be unnecessary, as the mobile device can communicate commands directly to the selected wagering game machine. In some embodiments, the wagering game server does not forward the commands because the server itself processes the commands (e.g., the wagering game server is a central authority for determining game results). The flow continues at block 310.

At block 310, if the wagering game session is terminated, the flow ends. If the wagering game session has not been terminated, the flow continues at block 312.

At block 312, the wagering game server may request verification information from the mobile device and/or the selected wagering game machine. In some embodiments, the wagering game server may request that the selected wagering game machine communicate a unique code to the mobile device. This unique code can be transmitted by any short-range medium such as NFC, Bluetooth, etc. Additionally, the selected wagering game machine can communicate a request to the mobile device to relay the unique code to the wagering game server, ensuring that the mobile device is in proximity to the selected wagering game machine. In some embodiments, verification information may be requested periodically, and may not be necessary before each command is communicated to the selected wagering game machine. In other embodiments, verification information may be requested before each command is communicated to the selected wagering game machine. If verification is not required, the flow continues at block 306. If verification is required, the flow continues at block 314.

At block 314, the wagering game server transmits verification request(s) to the mobile device and/or selected wagering game machine. In some embodiments, the wagering game server may request that the selected wagering game machine communicate a unique code to the mobile device. The flow continues at block 316.

At block 316, the wagering game server receives verification information from the mobile device and/or the selected wagering game machine indicating that the mobile device is in proximity to the selected wagering game machine. Referring to the example above, the selected wagering game machine can present a unique code to the mobile device. In turn, the wagering game machine and the mobile device can send the codes to the wagering game server. After receiving the unique codes, the wagering game server can compare the two codes to ensure that the mobile device is in proximity to the selected wagering game machine. If the codes match, the wagering game server presumes the mobile device is in proximity to the wagering game machine. The flow continues at block 306 (see description above). From block 306, the flow repeats until the wagering game session is terminated at block 310.

Figure 4:
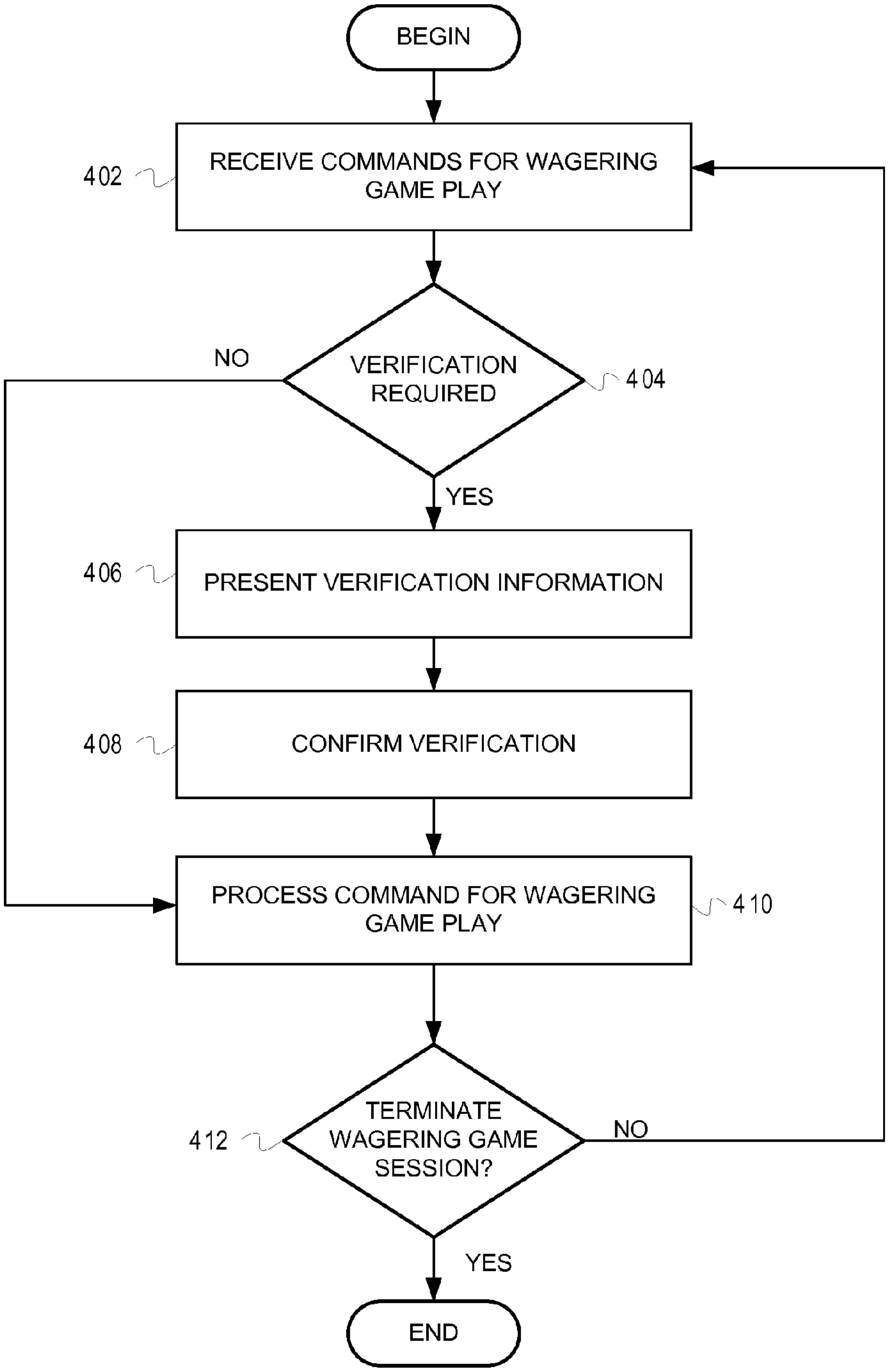
FIG. 4 is a flow diagram illustrating operations for enabling a mobile device to play wagering games via a selected wagering game machine, according to some embodiments of the inventive subject matter.

While FIG. 3 describes how the wagering game server interacts with the mobile device and the wagering game machine, FIG. 4 describes how the wagering game machine interacts with the mobile device and the wagering game server.

FIG. 4 is a flow diagram illustrating operations for enabling a mobile device to play wagering games via a selected wagering game machine, according to some embodiments of the inventive subject matter. The flow begins at block 402.

At block 402, the selected wagering game machine receives commands for wagering game play. Such commands can include commands to initiate game play, place bets, etc. In some embodiments, the selected wagering game machine receives the commands directly from the mobile device. In other embodiments, the selected wagering game machine receives the commands from the wagering game server. The flow continues at block 404.

At block 404, verification may be required. In some embodiments, verification that the mobile device is in proximity to the selected wagering game machine may be required before each command is processed by the selected wagering game machine. In other embodiments, verification may be required only once every certain number of commands, or periodically. If verification is not required, the flow continues at block 410. If verification is required, the flow continues at block 406.

At block 406, the wagering game machine presents verification information. For example, the selected wagering game machine may present a request to the mobile device, requesting the mobile device to emit a specific frequency sound. This request may be communicated by any suitable medium, whether short-range or long-range. It should be noted however that if long-range communication is used, the mobile device should emit a sound that would not be perceivable at the selected wagering game machine if the mobile device is not in proximity to the selected wagering game machine. The wagering game machine can employ other measures, such as presenting a unique code to the mobile device, presenting two audio signals that create a third signal if the mobile device is in proximity, etc. The flow continues at block 408.

At block 408, the selected wagering game machine confirms the verification. For example, continuing the discussion above, the selected wagering game machine may perceive the sound emitted by the mobile device. If the frequency of the sound matches the frequency requested by the selected wagering game machine, the selected wagering game machine can confirm that the mobile device is in proximity to the selected wagering game machine. In some embodiments, the wagering game machine can employ other measures, such as presenting a unique code to the mobile device, presenting two audio signals that create a third signal if the mobile device is in proximity, etc. In some embodiments, the wagering game machine can forward verification information received from the mobile device to the wagering game server to verify proximity. The flow continues at block 410.

At block 410, the wagering game machine processes the command for wagering game play. For example, the wagering game machine can process a reel spin, a bet indicator, etc. The flow continues at block 412.

At block 412, if the wagering game session is terminated, the flow ends. If the wagering game session has not been terminated, the flow continues at block 402. The flow repeats until the wagering game session is terminated at block 412.

Figure 5:
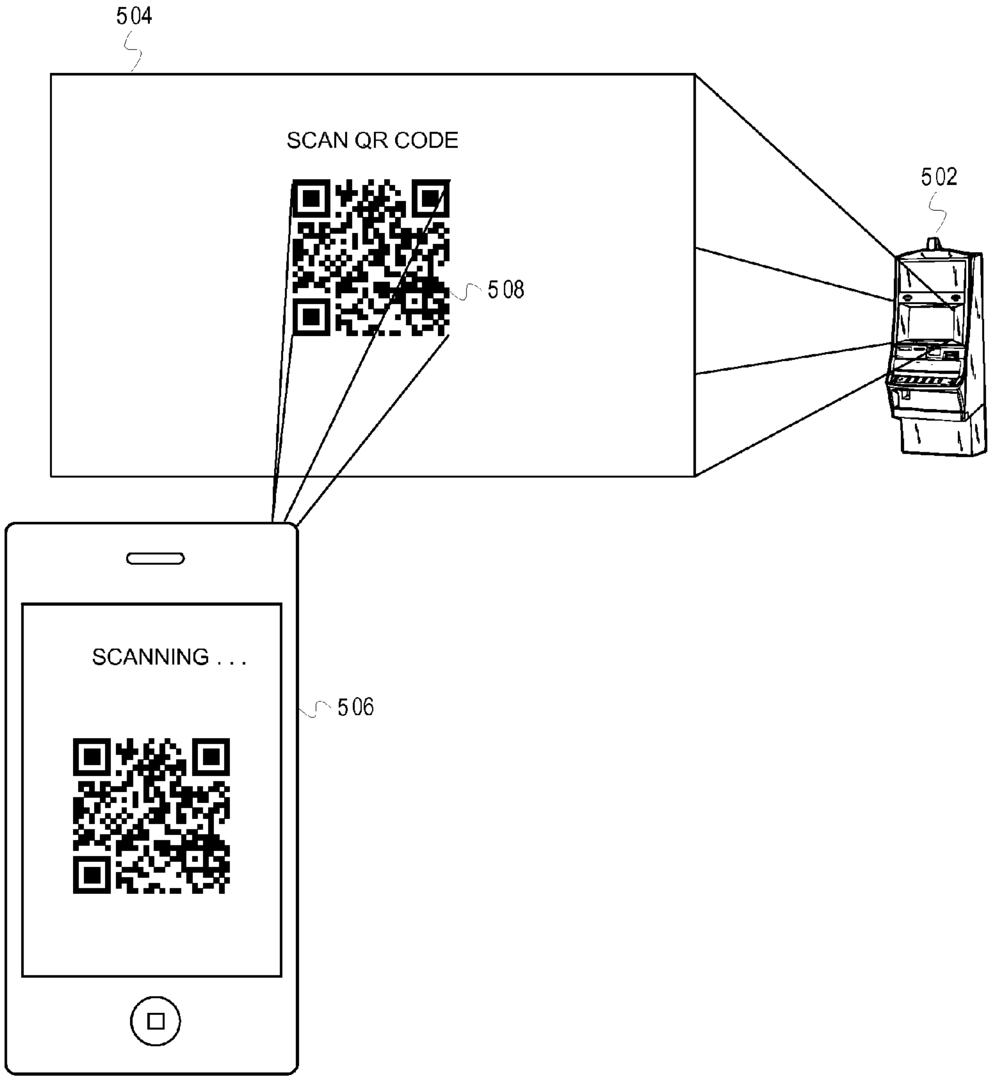
FIG. 5 is a diagrammatic illustration of identifying a selected wagering game machine 502 using a unique indicator 508 and a mobile device 506.

FIG. 5 is a diagrammatic illustration of identifying a selected wagering game machine 502 using a unique indicator 508 and a mobile device 506. Many techniques can be used to indicate which wagering game machine is the selected wagering game machine 502 with which to associate the mobile device 506. In some embodiments, the unique code or image can be dynamic, and refreshed before a new wagering game session begins. For example, a player may request to initiate a wagering game session at the selected wagering game machine 502 on their mobile device 506. In response, the selected wagering game machine 502 can present a unique code or image on its display, specific to that wagering game session. In other embodiments, wagering game machines can have static unique identifiers presented either on a display device (e.g., a liquid crystal display) or on the wagering game machine itself (e.g., an image affixed to the machine's cabinet). The unique code or image can be a code containing letters and/or numbers and/or other symbols, a two-dimensional bar code, a three-dimensional bar code, an image, etc. The player can enter or scan the unique indicator on the mobile device 506.

As depicted in FIG. 5, the unique indicator is a quick reference code ("QR code") 508. In FIG. 5, the QR code 508 is presented on the display 504 of the selected wagering game machine 502. The QR code 508 is then scanned using the mobile device 506. In FIG. 5, the wagering game machine 502 presents the QR code 508 on the display device 504 of the wagering game machine 502.

Figure 6:
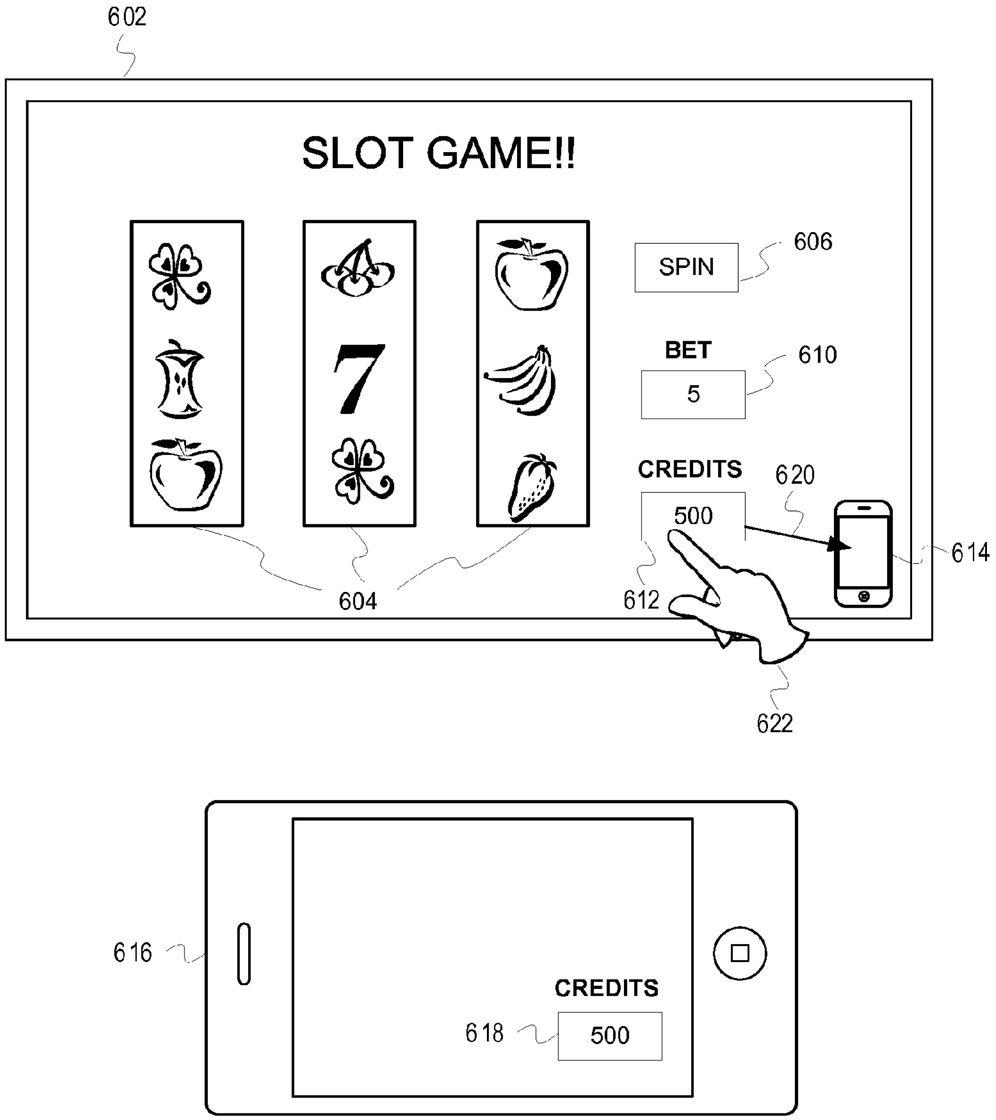
FIG. 6 is a diagrammatic illustration of moving wagering game elements from a wagering game machine display 602 to a mobile device 616.

While FIG. 5 describes techniques for selecting a wagering game machine, FIG. 6 describes presenting wagering game content on the wagering game machine display 602 and a mobile device 616.

FIG. 6 is a diagrammatic illustration of moving wagering game elements from a wagering game machine display 602 to a mobile device 616. In some embodiments, a player may be able to select which wagering game elements to present on the mobile device 616. For example, a player may wish to present the spin button 606, the bet meter 610, or the slot reels 604 on the mobile device 616.

As depicted in FIG. 6, the player has selected to present the credit meter 612 on the mobile device 616. In some embodiments, wagering game elements may only be presented on one of the wagering game machine display 602 and the mobile device 616. In other words, if the player selects the credit meter 612 to be presented on the mobile device 616, it will no longer be presented on the wagering game machine display 602. In other embodiments, selected wagering game elements may appear on both the mobile device 616 and the wagering game machine display 602.

In some embodiments, the player may select wagering game elements to present on the mobile device 616 by dragging the select game elements to a mobile device icon 614 on the wagering game machine display 602. Such operation is illustrated by hand 622 and arrow 620. After the drag-and-drop operation, the credit meter 618 will now be presented on the mobile device 616.

Figure 7:
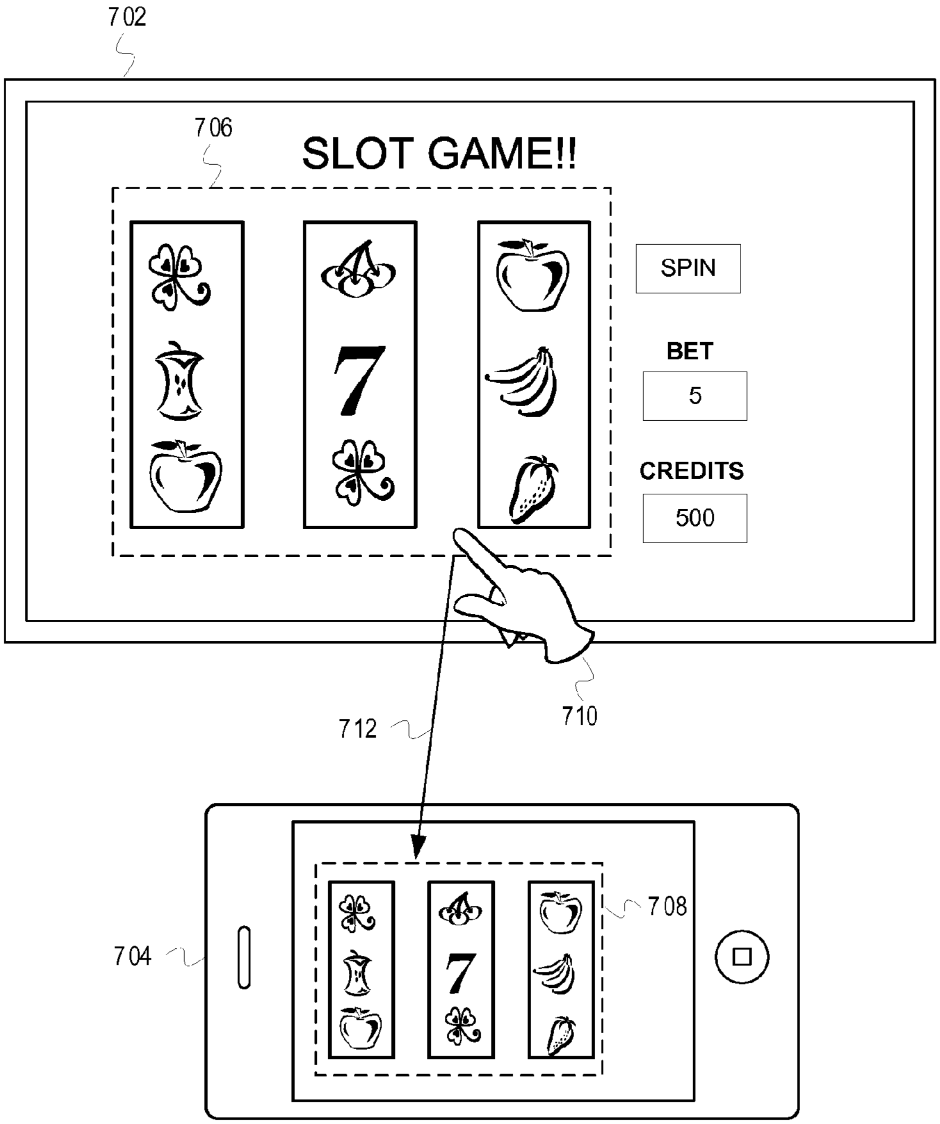
FIG. 7 is a diagrammatic illustration of moving wagering game elements from a wagering game machine display 702 to a mobile device 704.

FIG. 7 is a diagrammatic illustration of moving wagering game elements from a wagering game machine display 702 to a mobile device 704. As previously discussed (see discussion of FIG. 6), in some embodiments, a player may be able to select which wagering game elements to present on the mobile device 704. Unlike FIG. 6, where the selected wagering game element is dragged to a mobile device icon, in some embodiments, a player may simply drag the selected wagering game elements off-screen of the wagering game machine display 702.

As depicted in FIG. 7, the player 710 is dragging slot reels 706 off-screen of the wagering game machine display 702 as indicated by arrow 712. The result of such operation is to present slot reels 708 on the mobile device 704. In some embodiments, this may exclude slot reels 706 from being presented on the wagering game machine display 702. In other embodiments, slot reels 706 may be presented on the wagering game machine display 702 in addition to slot reels 708 being presented on mobile device 704. Although slot reels 706 and slot reels 708 are independently numbered, they are the same slot reels. In other words, slot reels 708 mirror slot reels 706 in operation.

Figure 8:
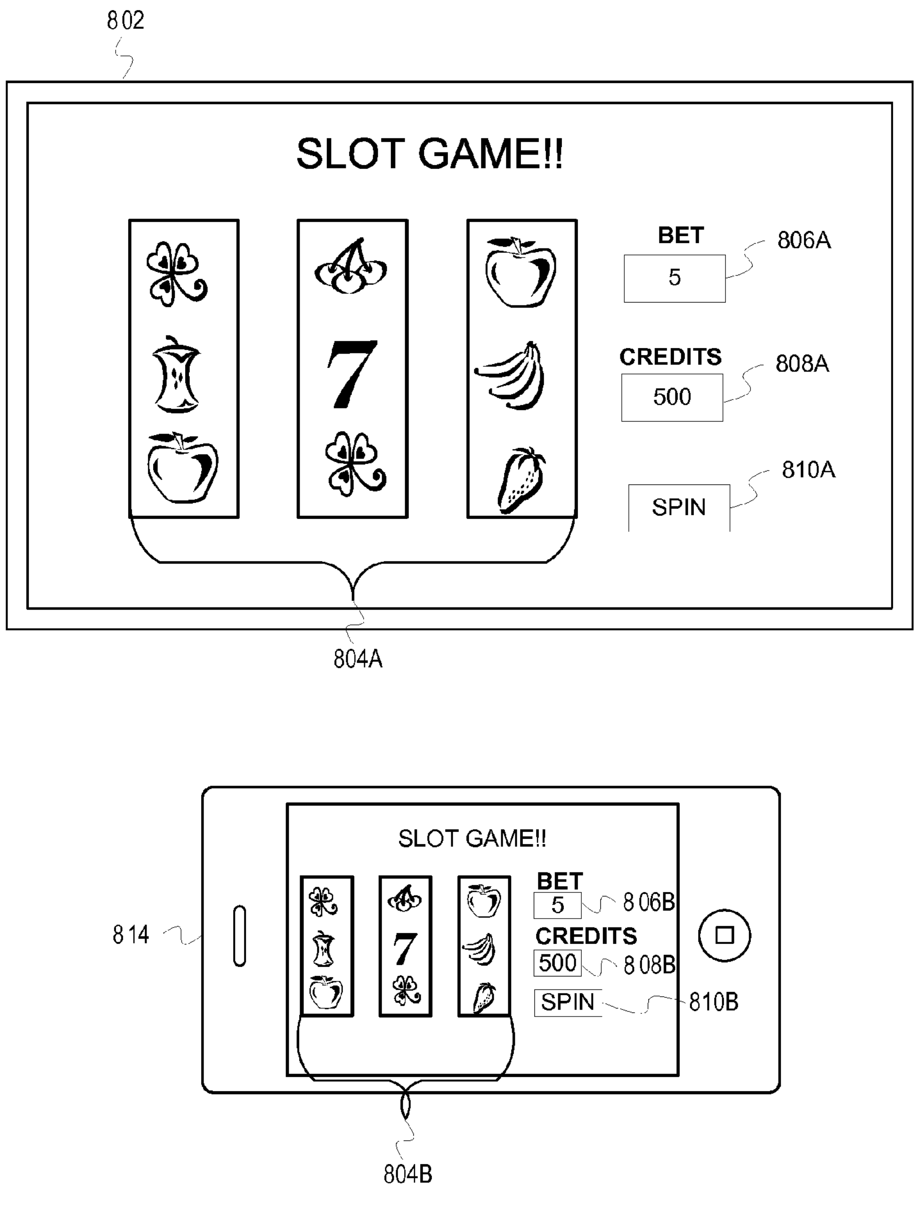
FIG. 8 is a diagrammatic illustration of mirroring a wagering game machine display 802 on a mobile device 814.

FIG. 8 is a diagrammatic illustration of mirroring a wagering game machine display 802 on a mobile device 814. In some embodiments, the entire wagering game may be presented simultaneously on the wagering game machine display 802 and the mobile device 814. As shown in FIG. 8, the wagering game has slot reel elements 804A, bet meter 806A, credit meter 808A, and spin button 810A. Each game element is presented on the wagering game machine display 802. Additionally, each wagering game element is presented on the mobile device 814. As depicted, the mobile device 814 is presenting corresponding slot reels 804B, bet meter 806B, credit meter 808B, and spin button 808B.

In some embodiments, the player can interact with the wagering game machine either by physically indicating commands on the wagering game machine, or by indicating commands via the mobile device. Additionally, the player may be able to modify the presentation of the wagering game on the mobile device 814. For example, the player may be able to zoom in on wagering game elements on the mobile device 814, using pinch-to-zoom, or similar gestures. When zoomed in on the mobile device 814, the player may be able to pan by sliding the presentation of the wagering game on the mobile device 814 from side-to-side.

Operating Environment

This section describes an example operating environment and presents structural aspects of some embodiments. This section includes discussion about wagering game machine architectures, wagering game networks, etc.

Wagering Game Machine Architectures

Figure 9:
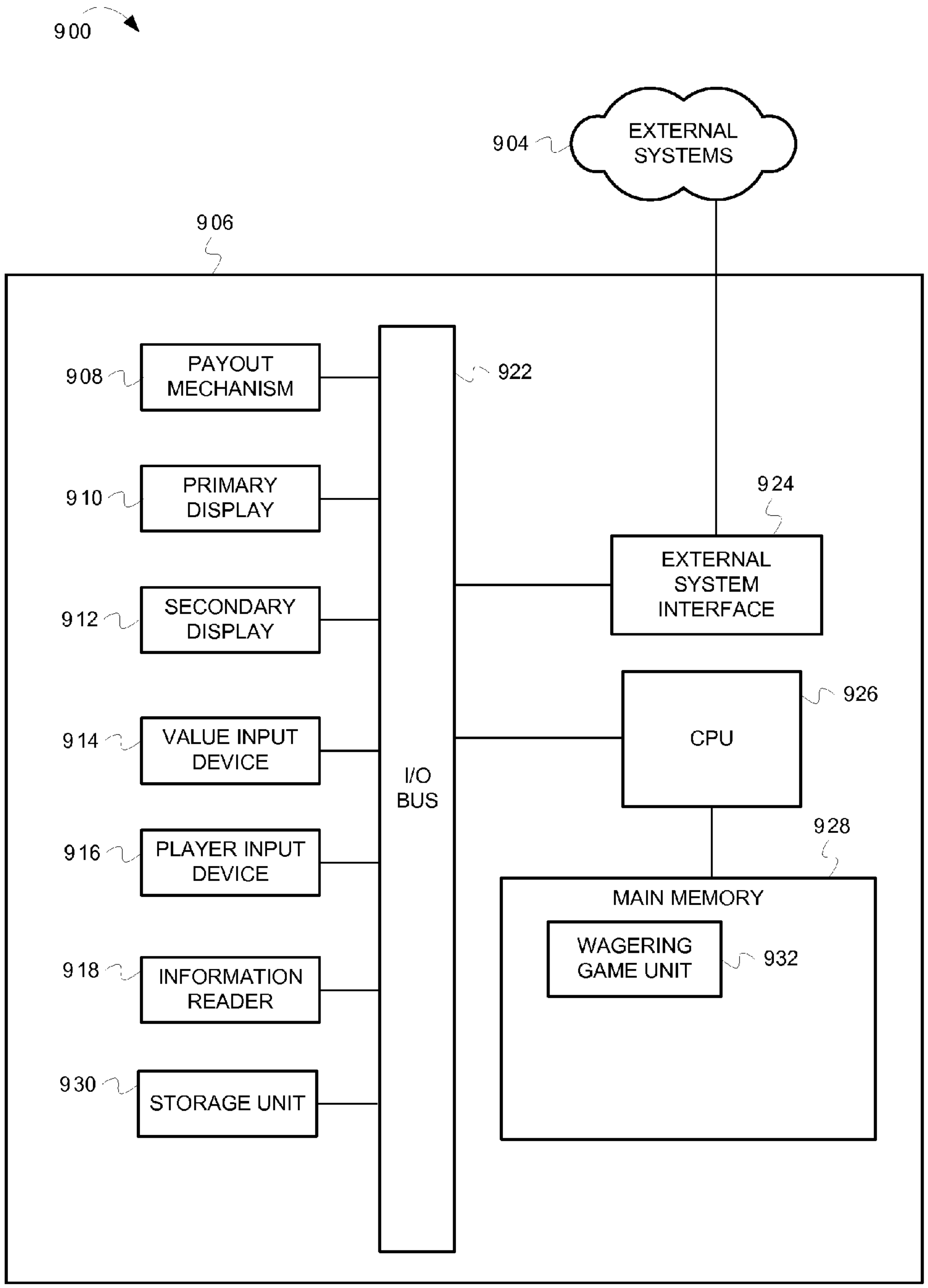
FIG. 9 is a block diagram illustrating a wagering game machine architecture, according to example embodiments of the invention.

FIG. 9 is a block diagram illustrating wagering game machine architecture, according to example embodiments of the invention. As shown in FIG. 9, the wagering game machine architecture 900 includes a wagering game machine 906, which includes a central processing unit (CPU) 926 connected to main memory 928. The CPU 926 can include any suitable processor, such as an Intel® Pentium processor, Intel® Core 2 Duo processor, AMD Opteron™ processor, or UltraSPARC processor. The main memory 928 includes a wagering game unit 932. In one embodiment, the wagering game unit 932 can present wagering games, such as video poker, video black jack, video slots, video lottery, etc., in whole or part.

The CPU 926 is also connected to an input/output (I/O) bus 922, which can include any suitable bus technologies, such as an AGTL+ frontside bus and a PCI backside bus. The I/O bus 922 is connected to a payout mechanism 908, primary display 910, secondary display 912, value input device 914, player input device 916, information reader 918, and storage unit 930. The player input device 916 can include the value input device 914 to the extent the player input device 916 is used to place wagers. The I/O bus 922 is also connected to an external system interface 924, which is connected to external systems 904 (e.g., wagering game networks).

In one embodiment, the wagering game machine 906 can include additional peripheral devices and/or more than one of each component shown in FIG. 9. For example, in one embodiment, the wagering game machine 906 can include multiple external system interfaces 924 and/or multiple CPUs 926. In one embodiment, any of the components can be integrated or subdivided.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

While FIG. 9 describes an example wagering game machine architecture, this section continues with a discussion wagering game networks.

Wagering Game Networks

Figure 10:
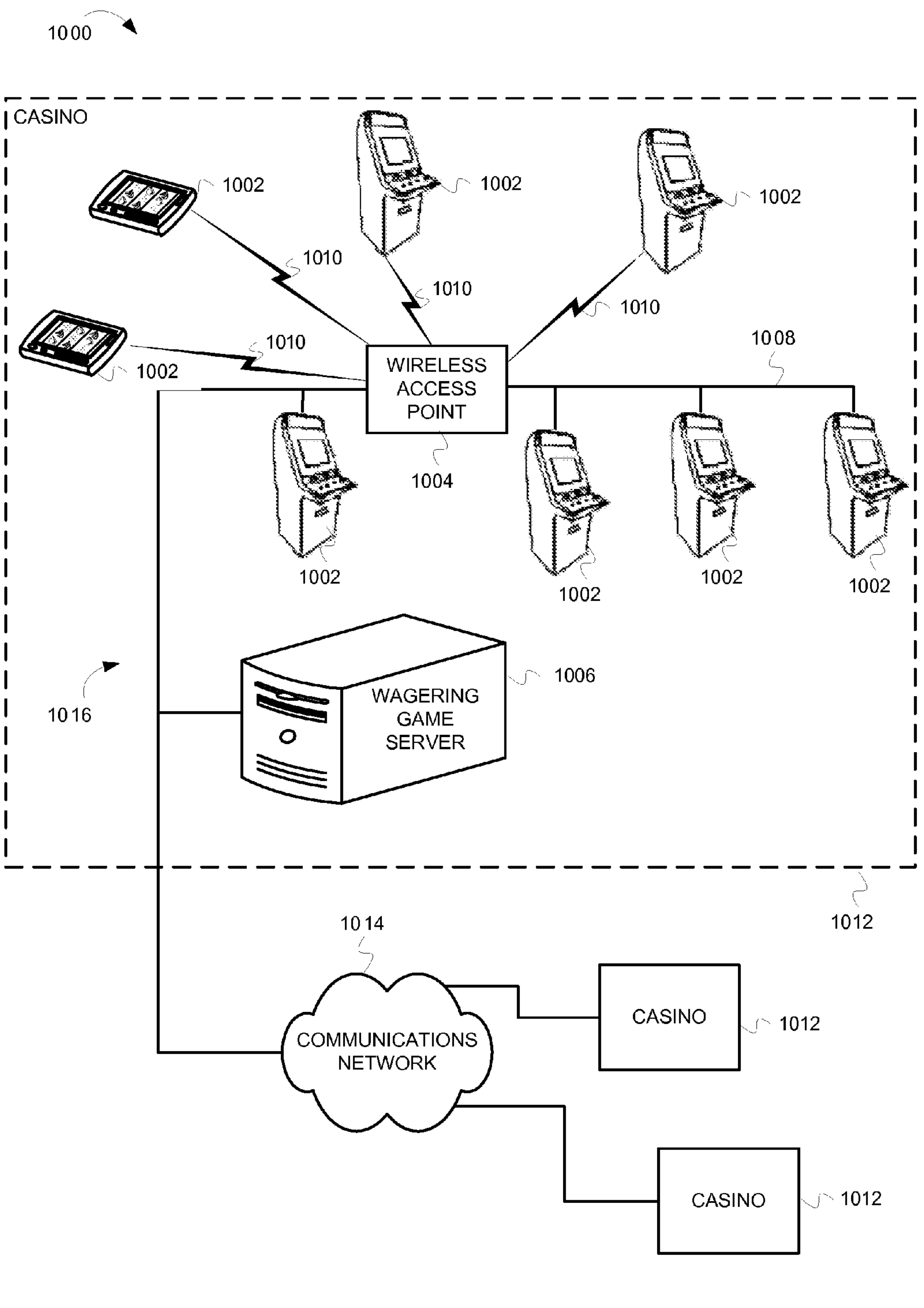
FIG. 10 is a block diagram illustrating a wagering game network 1000, according to example embodiments of the invention.

FIG. 10 is a block diagram illustrating a wagering game network 1000, according to example embodiments of the invention. As shown in FIG. 10, the wagering game network 1000 includes a plurality of casinos 1012 connected to a communications network 1014.

Each casino 1012 includes a local area network 1016, which includes an access point 1004, a wagering game server 1006, and wagering game machines 1002. The access point 1004 provides wireless communication links 1010 and wired communication links 1008. The wired and wireless communication links can employ any suitable connection technology, such as Bluetooth, 802.11, Ethernet, public switched telephone networks, SONET, etc. In some embodiments, the mobile device can connect to the wireless access point 1004 using a cellular connection with virtual private network technology. In some embodiments, the mobile device can be authenticated at the wireless access point 1004 before gaining access to the wagering game network. In some embodiments, the wagering game server 1006 can serve wagering games and distribute content to devices located in other casinos 1012 or at other locations on the communications network 1014.

The wagering game machines 1002 described herein can take any suitable form, such as floor standing models, bartop models, workstation-type console models, etc. Further, the wagering game machines 1002 can be primarily dedicated for use in conducting wagering games, or can include non-dedicated devices. In one embodiment, the wagering game network 1000 can include other network devices, such as accounting servers, wide area progressive servers, player tracking servers, and/or other devices suitable for use in connection with embodiments of the invention.

In some embodiments, wagering game machines 1002 and wagering game servers 1006 work together such that a wagering game machine 1002 can be operated as a thin, thick, or intermediate client. For example, one or more elements of game play may be controlled by the wagering game machine 1002 (client) or the wagering game server 1006 (server). Game play elements can include executable game code, lookup tables, configuration files, game outcome, audio or visual representations of the game, game assets or the like. In a thin-client example, the wagering game server 1006 can perform functions such as determining game outcome or managing assets, while the wagering game machine 1002 can present a graphical representation of such outcome or asset modification to the user (e.g., player). In a thick-client example, the wagering game machines 1002 can determine game outcomes and communicate the outcomes to the wagering game server 1006 for recording or managing a player's account. Additionally, web server software may run on the wagering game server 1006 to facilitate communication between the mobile device and the selected wagering game machine.

In some embodiments, either the wagering game machines 1002 (client) or the wagering game server 1006 can provide functionality that is not directly related to game play. For example, account transactions and account rules may be managed centrally (e.g., by the wagering game server 1006) or locally (e.g., by the wagering game machine 1002). Other functionality not directly related to game play may include power management, presentation of advertising, software or firmware updates, system quality or security checks, etc.

Any of the wagering game network components (e.g., the wagering game machines 1002) can include hardware and machine-readable media including instructions for performing the operations described herein.

Example Wagering Game Machines

Figure 11:
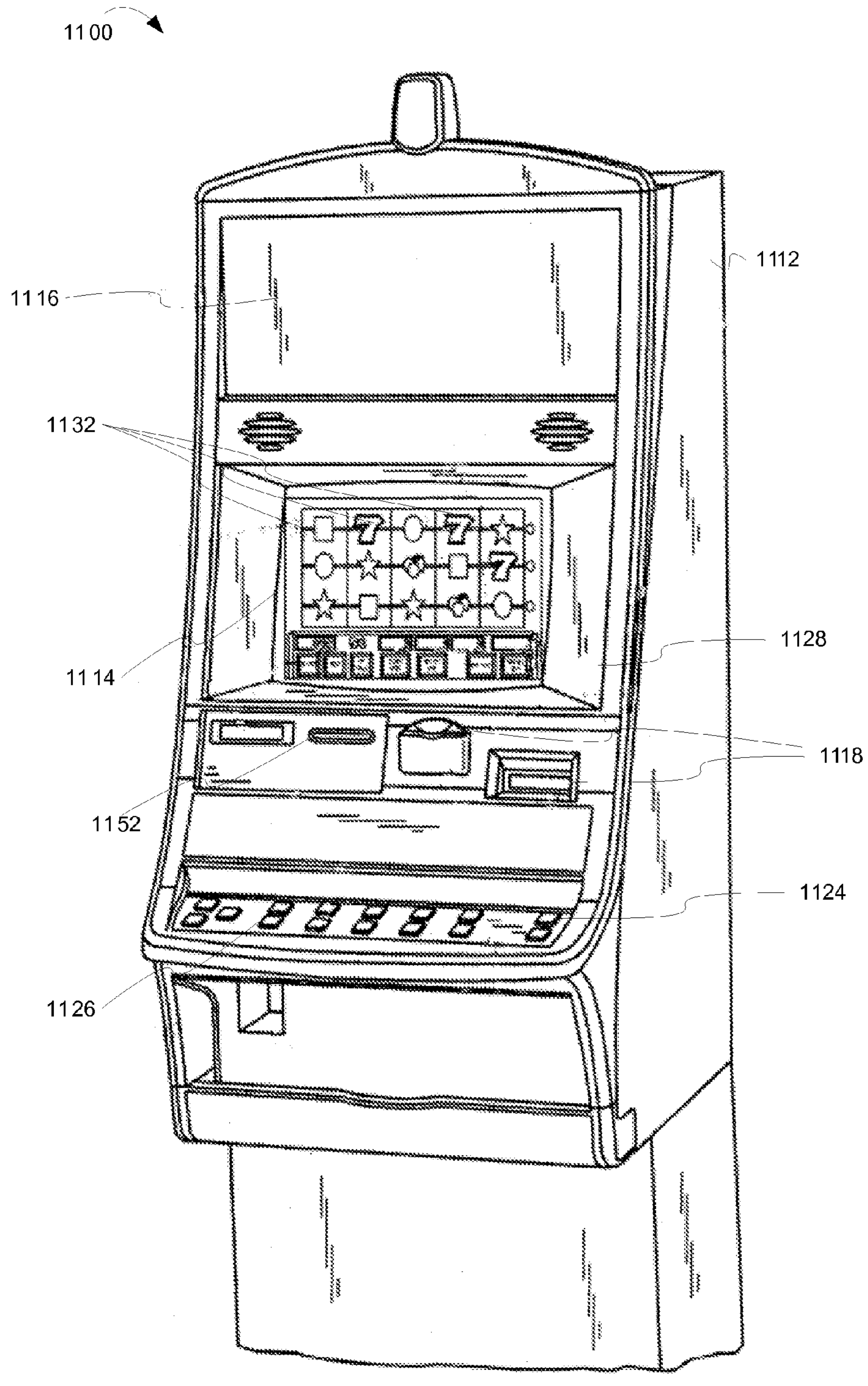
FIG. 11 is a perspective view of a wagering game machine, according to example embodiments of the invention.

FIG. 11 is a perspective view of a wagering game machine, according to example embodiments of the invention. Referring to FIG. 11, a wagering game machine 1100 is used in gaming establishments, such as casinos. According to embodiments, the wagering game machine 1100 can be any type of wagering game machine and can have varying structures and methods of operation. For example, the wagering game machine 1100 can be an electromechanical wagering game machine configured to play mechanical slots, or it can be an electronic wagering game machine configured to play video casino games, such as blackjack, slots, keno, poker, blackjack, roulette, etc.

The wagering game machine 1100 comprises a housing 1112 and includes input devices, including value input devices 1118 and a player input device 1124. For output, the wagering game machine 1100 includes a primary display 1114 for displaying information about a basic wagering game. The primary display 1114 can also display information about a bonus wagering game and a progressive wagering game. The wagering game machine 1100 also includes a secondary display 1116 for displaying wagering game events, wagering game outcomes, and/or signage information. While some components of the wagering game machine 1100 are described herein, numerous other elements can exist and can be used in any number or combination to create varying forms of the wagering game machine 1100.

The value input devices 1118 can take any suitable form and can be located on the front of the housing 1112. The value input devices 1118 can receive currency and/or credits inserted by a player. The value input devices 1118 can include coin acceptors for receiving coin currency and bill acceptors for receiving paper currency. Furthermore, the value input devices 1118 can include ticket readers or barcode scanners for reading information stored on vouchers, cards, or other tangible portable storage devices. The vouchers or cards can authorize access to central accounts, which can transfer money to the wagering game machine 1100.

The player input device 1124 comprises a plurality of push buttons on a button panel 1126 for operating the wagering game machine 1100. In addition, or alternatively, the player input device 1124 can comprise a touch screen 1128 mounted over the primary display 1114 and/or secondary display 1116.

The various components of the wagering game machine 1100 can be connected directly to, or contained within, the housing 1112. Alternatively, some of the wagering game machine's components can be located outside of the housing 1112, while being communicatively coupled with the wagering game machine 1100 using any suitable wired or wireless communication technology.

The operation of the basic wagering game can be displayed to the player on the primary display 1114. The primary display 1114 can also display a bonus game associated with the basic wagering game. The primary display 1114 can include a cathode ray tube (CRT), a high resolution liquid crystal display (LCD), a plasma display, light emitting diodes (LEDs), or any other type of display suitable for use in the wagering game machine 1100. Alternatively, the primary display 1114 can include a number of mechanical reels to display the outcome. In FIG. 11, the wagering game machine 1100 is an "upright" version in which the primary display 1114 is oriented vertically relative to the player. Alternatively, the wagering game machine can be a "slant-top" version in which the primary display 1114 is slanted at about a thirty-degree angle toward the player of the wagering game machine 1100. In yet another embodiment, the wagering game machine 1100 can exhibit any suitable form factor, such as a free standing model, bartop model, or workstation console model.

A player begins playing a basic wagering game by making a wager via the value input device 1118. The player can initiate play by using the player input device's buttons or touch screen 1128. The basic game can include arranging a plurality of symbols along a payline 1132, which indicates one or more outcomes of the basic game. Such outcomes can be randomly selected in response to player input. At least one of the outcomes, which can include any variation or combination of symbols, can trigger a bonus game.

In some embodiments, the wagering game machine 1100 can also include an information reader 1152, which can include a card reader, ticket reader, bar code scanner, RFID transceiver, or computer readable storage medium interface. In some embodiments, the information reader 1152 can be used to award complimentary services, restore game assets, track player habits, etc.

Example Verification Techniques

In some embodiments, the selected wagering game machine may cause the chair associated with the selected wagering game machine to move. Such movement can cause the mobile device to move as well. The movement captured by sensors in the mobile device can then be compared with the movement of the chair to ensure that the mobile device is in proximity to the selected wagering game machine.

In some embodiments, the proximity verification can be accomplished using an image capture device on the mobile device. At periodic intervals, the wagering game server and/or the selected wagering game machine can request presentation of an image from the mobile device. During the verification process, the selected wagering game machine can present a unique identifier, such as a code, and image, etc. The wagering game server and/or the selected wagering game machine can then request the mobile device to relay the unique identifier to the wagering game server and/or the selected wagering game machine, ensuring that the mobile device is in proximity to the selected wagering game machine.

In some embodiments, the proximity verification can be accomplished via pairing, such as by Bluetooth. For example, at the start of a wagering game session, the mobile device can pair with the selected wagering game machine. This pairing can be accomplished via short-range communication. If at any point the mobile device fails to communicate with, or remained parried with, the selected wagering game machine, the wagering game session may terminate.

In some embodiments, the proximity can be accomplished via an image capture device on the selected wagering game machine. An image capture device can determine whether a player is seated at the selected wagering game machine, verifying proximity of the mobile device to the selected wagering game machine.

In some embodiments, the proximity verification can be accomplished using sensor associated with the selected wagering game machine. For example, a weight sensor in the seat or near that base of the selected wagering game machine can detect the presence of a player. If the player is present, it may verify that the mobile device is in proximity to the selected wagering game machine.

General

Although the examples presented herein describe associating a single mobile device with a wagering game machine, in some embodiments, more than one mobile device can be associated with a wagering game machine. In such embodiments, a plurality of players may be able to play and/or control multi-player wagering games from their mobile devices. When multiple mobile devices are associated with a wagering game machine, each mobile device may control and/or present different aspects of the wagering game. In some embodiments, the multiple mobile devices may control and/or present the same aspects of the wagering game.

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method comprising:

communicably connecting a mobile device to a wagering game server on a wagering game network;

associating, by the wagering game server, the mobile device with a selected wagering game machine among a plurality of wagering game machines on the wagering game network;

providing content to present on the mobile device, the content including a play initiation button of a wagering game played via the selected wagering game machine, wherein the selected wagering game machine includes a value input device configured to receive monetary value for placement of one or more wagers in the wagering game;

in response to the play initiation button being actuated, receiving, at the wagering game server, a command from the mobile device to initiate play of the wagering game; and in response to the command, presenting a result of the wagering game on the selected wagering game machine.

2. The method of claim 1, wherein the content includes a credit meter, and wherein the providing the content includes providing the credit meter for presentation on the mobile device but not on the selected wagering game machine.

3. The method of claim 1, wherein the associating includes receiving, by the wagering game server from the mobile device, a unique code associated with the selected wagering game machine.

4. The method of claim 3, wherein the unique code is a visual code presented on the selected wagering game machine and captured by the mobile device.

5. The method of claim 1 further comprising in response to a gesture made with the mobile device, receiving, at the wagering game server, a command indicating an action in the wagering game and executing the action.

6. The method of claim 1 further comprising forwarding the command to the selected wagering game machine.

7. The method of claim 1 further comprising randomly selecting the result of the wagering game.

8. The method of claim 1 further comprising transmitting the content for the play initiation button from the wagering game server to the mobile device.

9. The method of claim 1 further comprising requesting and receiving verification information indicating that the mobile device is in proximity to the selected wagering game machine.

10. The method of claim 1, wherein the wagering game includes a plurality of elements, and further comprising permitting a player to select which of the plurality of elements to present on the selected wagering game machine and which of the plurality of elements to present on the mobile device.

11. The method of claim 1 further comprising presenting the play initiation button on the selected wagering game machine.

12. A method comprising:

communicably connecting a mobile device to a wagering game server on a wagering game network;

transmitting, from the mobile device to the wagering game server, a request to associate with a selected wagering game machine among a plurality of wagering game machines on the wagering game network;

receiving, at the mobile device from the wagering game server, an indication that the mobile device is associated with the selected wagering game machine;

receiving, at the mobile device, content including a play initiation button for a wagering game played via the selected wagering game machine, wherein the selected wagering game machine includes a value input device configured to receive monetary value for placement of one or more wagers in the wagering game;

presenting the content on the mobile device; and in response to player input selecting the play initiation button, transmitting, from the mobile device to the wagering game server, a command to initiate play of the wagering game, wherein a result of the wagering game is presented on the selected wagering game machine.

13. The method of claim 12, wherein the content includes a credit meter, and wherein the credit meter is not presented on the selected wagering game machine.

14. The method of claim 12 further comprising:

capturing, by the mobile device, a unique code associated with the selected wagering game machine, wherein the request to associate with the selected wagering game machine includes the unique code.

15. The method of claim 12 further comprising:

detecting, via the mobile device, a gesture performed with the mobile device; and in response to the detecting the gesture, transmitting, to the wagering game server, a command indicating an action in the wagering game.

16. The method of claim 12 further comprising:

transmitting verification information indicating that the mobile device is in proximity to the selected wagering game machine.

17. The method of claim 12, wherein the wagering game includes a plurality of elements and further comprising:

receiving, at the mobile device, input selecting one or more of the plurality of elements; and presenting, on the mobile device, the one or more of the plurality of elements.

18. An apparatus comprising:

at least one processor; and a computer readable storage medium having computer usable program code executable by the at least one processor, the computer usable program code including code to communicably connect a mobile device to a wagering game server on a wagering game network, associate, by the wagering game server, the mobile device with a selected wagering game machine among a plurality of wagering game machines on the wagering game network, provide content to present on the mobile device, the content including a play initiation button of a wagering game played via the selected wagering game machine, wherein the selected wagering game machine includes a value input device configured to receive monetary value for placement of one or more wagers in the wagering game, in response to the play initiation button being actuated, receive, at the wagering game server, a command from the mobile device to initiate play of the wagering game, and in response to the command, present a result of the wagering game on the selected wagering game machine.

19. The apparatus of claim 18, wherein the content includes a credit meter, and wherein the code to provide the content includes code to provide the credit meter for presentation on the mobile device but not on the selected wagering game machine.

20. The apparatus of claim 18, wherein the code to associate includes code to receive, by the wagering game server from the mobile device, a unique code associated with the selected wagering game machine.

21. The apparatus of claim 20, wherein the unique code is a visual code presented on the selected wagering game machine and captured by the mobile device.

22. The apparatus of claim 18, wherein the computer usable code further includes code to:

in response to a gesture made with the mobile device, receive, at the wagering game server, a command indicating an action in the wagering game, and execute the action.

23. The apparatus of claim 18, wherein the computer usable code further includes code to:

forward the command to the selected wagering game machine.

24. The apparatus of claim 18, wherein the computer usable code further includes code to:

randomly select the result of the wagering game.

25. The apparatus of claim 18, wherein the computer usable code further includes code to:

transmit the content for the play initiation button from the wagering game server to the mobile device.

26. The apparatus of claim 18, wherein the computer usable code further includes code to:

request and receive verification information indicating that the mobile device is in proximity to the selected wagering game machine.

27. The apparatus of claim 18, wherein the wagering game includes a plurality of elements, and wherein the computer usable code further includes code to:

permit a player to select which of the elements to present on the selected wagering game machine and which of the elements to present on the mobile device.

28. The apparatus of claim 18, wherein the computer usable code further includes code to:

present the play initiation button on the selected wagering game machine.

29. A method comprising:

associating a mobile device with a selected wagering game machine among a plurality of wagering game machines on a wagering game network, the mobile device being communicably connected to a wagering game server on the wagering game network;

providing content to present on the mobile device, the content including a play initiation button of a wagering game played via the selected wagering game machine, wherein the selected wagering game machine includes a value input device configured to receive monetary value for placement of one or more wagers in the wagering game;

in response to the play initiation button being actuated, receiving, at the selected wagering game machine, a command to initiate play of the wagering game; and in response to the command, presenting a result of the wagering game on the selected wagering game machine.

30. The method of claim 29, wherein the command is received from the wagering game server.

31. The method of claim 29, wherein the content includes a credit meter, wherein the providing the content includes providing the credit meter for presentation on the mobile device but not on the selected wagering game machine.

32. The method of claim 29, wherein the associating includes providing, to the mobile device, a unique code associated with the selected wagering game machine.

33. The method of claim 32, wherein the unique code is a visual code presented on the selected wagering game machine for capture by the mobile device.

34. The method of claim 29 further comprising:

requesting, from the mobile device, verification information indicating that the mobile device is in proximity to the selected wagering game machine; and receiving, from the mobile device, the verification information.

35. The method of claim 29 further comprising:

presenting the play initiation button on the selected wagering game machine.

* * * * *